United States Patent [19]

Weeks

[11] Patent Number: 5,045,261
[45] Date of Patent: Sep. 3, 1991

[54] METHOD OF MAKING FIBER-REINFORCED RESIN WHEEL

[75] Inventor: James B. Weeks, Eaton Rapids, Mich.

[73] Assignee: Motor Wheel Corporation, Lansing, Mich.

[21] Appl. No.: 103,209

[22] Filed: Oct. 1, 1987

[51] Int. Cl.$^5$ .................... B29C 43/02; B29C 43/18
[52] U.S. Cl. .................... 264/108; 264/258; 264/325; 264/292; 301/63 PW
[58] Field of Search ............... 264/108, 257, 258, 326, 264/134, 319, 324, 325, 292; 301/63 PW

[56] References Cited

U.S. PATENT DOCUMENTS

| | | | |
|---|---|---|---|
| 3,369,843 | 2/1968 | Prew | 301/63 PW |
| 3,917,352 | 11/1975 | Gageby | 301/63 PW |
| 3,993,308 | 11/1976 | Jenks | 264/258 |
| 4,050,358 | 9/1977 | Humberstone | 264/258 |
| 4,146,274 | 3/1979 | Lejeune | 301/63 PW |
| 4,173,992 | 11/1979 | Lejeune | 301/63 PW |
| 4,483,729 | 11/1984 | Fujisaki | 301/63 PW |
| 4,532,097 | 7/1985 | Daniels | 264/258 |
| 4,532,169 | 7/1985 | Carley | 264/108 |
| 4,583,933 | 4/1986 | Woelfel | 425/330 |

Primary Examiner—Jay H. Woo
Assistant Examiner—Jeremiah F. Durkin, II
Attorney, Agent, or Firm—Barnes, Kisselle, Raisch, Choate, Whittemore & Hulbert

[57] ABSTRACT

A method of molding a cup-shaped article such as integral vehicle wheel rim and disc segment, wherein a plurality of sections of resin-impregnated cloth are placed over a substantially cylindrical mandrel. The cloth sections are substantially identical and have circular central portions which are stacked on the mandrel end face, and oppositely projecting wings which are draped over and are circumferentially staggered around the mandrel sidewall. The central axis of each sheet section is at an angle of 45° to the warp and weft fibers of the section cloth. The sheet sections thus form a mold charge which is compression molded to form an integral vehicle wheel rim and disc segment.

20 Claims, 3 Drawing Sheets

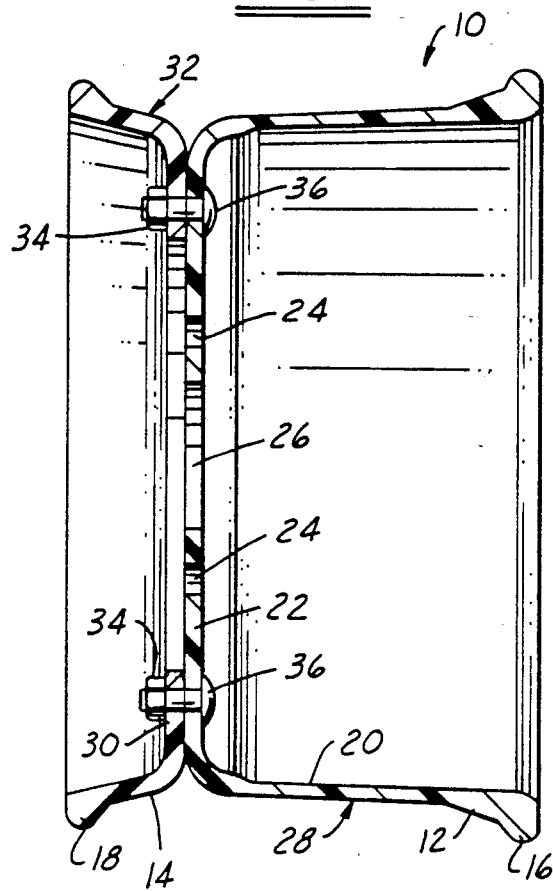
FIG.1
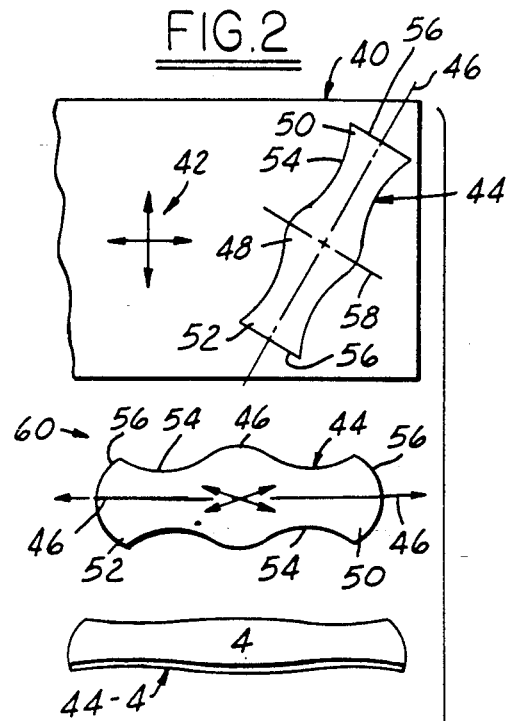
FIG.2
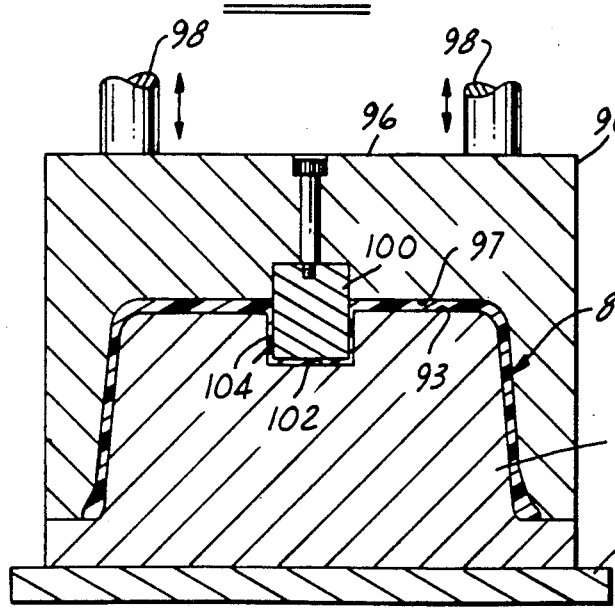
FIG.3
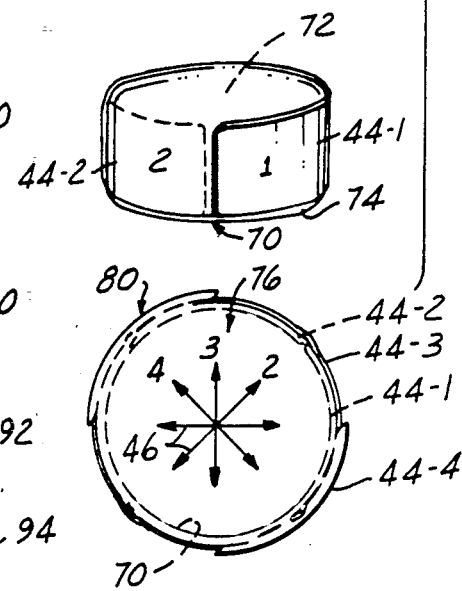

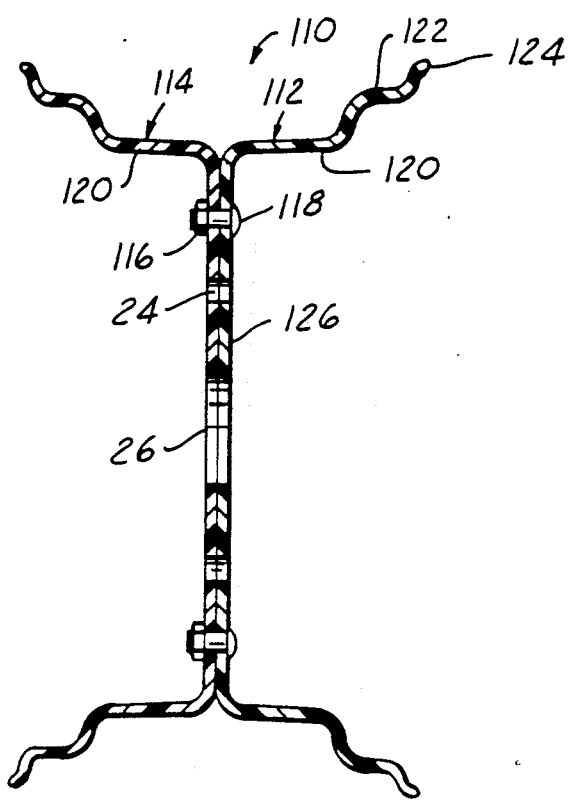
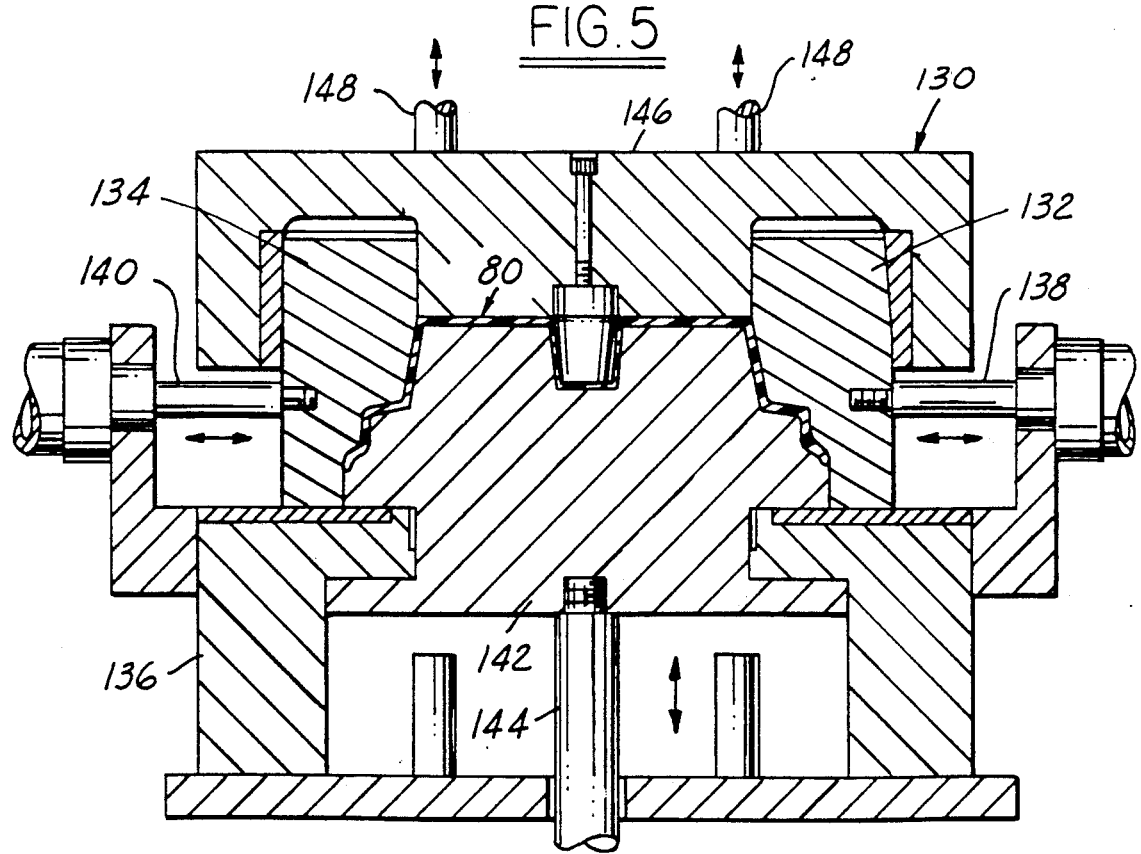

METHOD OF MAKING FIBER-REINFORCED RESIN WHEEL

The present invention is directed to manufacture of cup-shaped articles of fiber-reinforced resin construction, and more particularly to manufacture of integral rim and disc segment for fiber-reinforced resin vehicle wheels.

BACKGROUND OF THE INVENTION

In the manufacture of cup-shaped articles of fiber-reinforced resin construction, such as integral rim and disc segment for vehicle wheels, it has been proposed to form a compression mold charge by placing or draping square or rectangular sections of sheet molding compound—e.g., dry woven fiberglass cloth or resin-impregnated fiberglass cloth—over a cylindrical mandrel with ends of the sheet section circumferentially staggered around the mandrel sidewall. However, use of rectangular sheet sections as described causes puckering around the edges of the mandrel where the sheet sections fold over the end/sidewall edge. Furthermore, the end edges of the sheet sections are of non-uniform geometry, requiring substantial material waste in a trimming operation. Moreover, reinforcing fibers assume essentially uncontrolled orientation around the mandrel edge where the sheet sections pucker, thereby making selective fiber orientation difficult or impossible.

SUMMARY OF THE INVENTION

A general object of the present invention is to provide a method of manufacturing cup-shaped articles of fiber-reinforced resin construction, such as integral rim and disc segment for fiber-reinforced resin wheels, which overcomes the aforementioned deficiencies, which is economical to implement, which reduces trim and waste in the final product, and in which fiber orientation may be accurately controlled throughout the manufacturing process and in the final product.

BRIEF DESCRIPTION OF THE DRAWINGS

The invention, together with additional objects, features and advantages thereof, will be best understood from the following description, the appended claims and the accompanying drawings in which:

FIG. 1 is a sectional view diametrically bisecting a fiber-reinforced resin wheel manufactured in accordance with one embodiment of the invention;

FIG. 2 is a schematic illustration of development of a mold charge for manufacture of an integral rim and disc section in the wheel of FIG. 1;

FIG. 3 illustrates a compression mold for manufacture of an integral rim and disc section in the wheel of FIG. 1 employing the mold charge developed in FIG. 2;

FIG. 4 is a sectional view diametrically bisecting another wheel constructed in accordance with the invention;

FIG. 5 is a sectional view in side elevation of a mold for constructing an integral rim and disc section in the wheel of FIG. 4;

DESCRIPTION OF THE PREFERRED EMBODIMENTS

Figure 6:
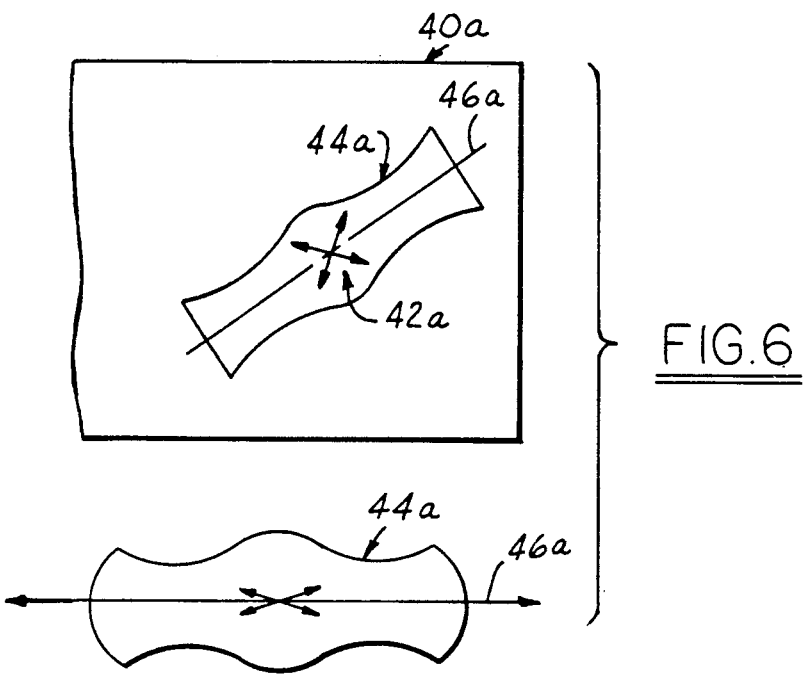
FIGS. 6 and 7 are schematic illustrations of mold charge development in accordance with modified embodiments of the invention.

FIG. 1 illustrates a fiber-reinforced resin vehicle wheel 10 having inboard and outboard beadseats 12, 14 with associated bead-retaining flanges 16, 18 and a rim base 20 extending between beadseats 12, 14. A wheel disc 22 internally spans rim base 20 and includes apertures 24, 26 for mounting wheel 10 to a vehicle. Disc 22, rim base 20, inboard beadseat 12 and flange 16 comprise an integrally-formed fiber-reinforced resin rim and disc segment 28. Outboard beadseat 14 and flange 18 comprise a removable band 32 which includes a radially inwardly projecting flange 30 affixed to disc section 22 by a circumferential array of nuts 34 received over corresponding studs 36 carried by disc section 22.

FIGS. 2 and 3 illustrate a process for manufacture of cup-shaped integral rim and disc segment 28 in wheel 10 of FIG. 1. A sheet 40 of molding compound is first selected having reinforced fibers oriented in preselected directions. For example, sheet 40 may comprise dry or resin-impregnated cloth having warp and weft fibers oriented in orthogonal directions 42 in FIG. 2. A plurality of sections 44 are then cut or otherwise formed from sheet 40, each having a central axis 46 at preselected orientation with respect to the directions 42 of fiber orientation. In the exemplary embodiment illustrated in FIG. 2 and described hereinafter, four sheet sections 44-1 through 44-4 are employed, it being understood that a greater or lesser number of sheet sections may be employed as desired depending upon thickness of the sheet sections and thickness of the desired rim and disc segment 28. In accordance with the present invention, each section 44 has a circular or ovate central portion 48 and a pair of diametrically opposed radially outwardly projecting wings 50, 52 integral with central portion 48. Each of the wings 50, 52 has opposed concave side edges 54 on opposite sides of central axis 46, and flat end edges 56 orthogonal to axis 46. Most preferably, sections 44 are cut from sheet 40 such that central axis 46 is at an angle of 45° with respect to the directions 42 of warp and weft fiber orientation. Each section 44 preferably is symmetrical with respect to axis 46 and with respect to the lateral axis 58 bisecting central portion 48 orthogonally of axis 46.

Each section 44 is then stretched in the direction of central axis 46, as illustrated at 60 in FIG. 2, such that the warp and weft directional fibers of section 44 shift orientation toward axis 46 to an angle less than 45° with respect thereto, and such that the section end edges 56 assume a convex contour as illustrated in FIG. 2. It has been found that resin-impregnated cloth of the character described hereinabove possesses hysteresis or memory in that section 44 retains contour 60 (FIG. 2) after stretching forces have been removed (and a limited amount of elastic relaxation takes place).

Sections 44—e.g., four sections 44-1 through 44-4 —so cut and stretched are then placed over a mandrel 70 having a substantially flat top 72 and a substantially cylindrical sidewall 74. The central axes 46 of sections 44-1 through 44-4 are angularly staggered around the central axis of mandrel 70 in a symmetrical pattern, such as that illustrated at 76 in FIG. 2. The diameter of central sheet portion 48 and the lateral and axial dimensions of wing portions 50, 52 are empirically selected so that the central sheet sections, as stretched at 60, have lateral dimensions corresponding substantially to the diameter of mandrel top 72 and the wings drape over the mandrel sidewalls 74 and slightly overlap at the circumferential edges, as illustrated in FIG. 2. It will be noted in FIG. 2 that the sheet sections 44-1 through 44-4 do not pucker or gather as folded over mandrel top, and that the end edges 56 lie substantially in a circle surrounding the mandrel axis, thereby enhancing control of fiber orientation and reducing waste in the final product.

The mold charge 80, comprising the sheet sections 44-1 through 44-4, is located in a compression mold 90 of the type illustrated in FIG. 3. Mold 90 includes a convex lower mold section 92 carried by a fixed base 94 and a concave upper mold section 96 coupled to the rams 98 for reciprocation axially toward and away from mold section 92. Each mold section 92, 96 has a corresponding face 93, 97 which cooperate with each other in the closed condition of the mold sections illustrated in FIG. 3 to form a mold cavity for compression molding of mold charge 80. With upper mold section 96 withdrawn (to a position not shown), mold charge 80 is located over lower mold section 92, either by forming and partially curing mold charge 80 on a separate mandrel 70 or by employing lower mold section 92 as the mold charge mandrel Upper mold section 96 is then moved downwardly by rams 98 to the closed position illustrated in FIG. 3, and held at that position under heat and pressure for a time sufficient to cure the mold charge and thereby form a rough integral rim and disc segment 28. Time, temperature and pressure for such curing operation are determined empirically in the usual manner. Mounting openings 24, 26 may be formed in disc section 22 either during the molding operation, as by inclusion of the boss 100 on upper mold section 96 and a corresponding pocket 102 in lower mold section 92 for forming an integral cup 104 in the disc section which may be later removed, or by drilling or otherwise forming the disc openings following the molding operation. Band 32 (FIG. 1) may be formed in a similar operation. (It will be appreciated that mold sections 92, 96 may be reversed, with section 92 coupled to rams 98 and section 96 affixed to base 94.)

FIG. 4 illustrates a vehicle wheel 110 comprising a pair of identical integral rim and disc segments 112, 114 fastened to each other, as by a circumferential array of nuts 116 received over corresponding studs 118. Each rim and disc segment 112, 114 includes a drop-center rim base portion 120, a beadseat 122 and a bead-retaining flange 124. Each disc section 126 spans the corresponding drop-center rim base section 120 and has suitable wheel mounting openings 24, 26. Each rim and disc segment 112, 114 is formed by first providing a mold charge 80 in the manner hereinabove described in detail in connection with FIG. 2, and then placing the mold charge into a mold of the type illustrated at 130 in FIG. 5. Mold 130 is identical in all substantial respects to that disclosed in U.S. Pat. No. 4,583,933 assigned to the assignee hereof. The disclosure of such patent is incorporated herein by reference. In general, mold 130 comprises at least two radially reciprocable rim mold sections 132, 134 slideably carried on a base 136 and coupled to respective rams 138, 140. A lower disc mold segment 142 is coupled to a ram 144 for axial reciprocation with respect to base 136. Likewise, an upper disc mold section 146 is coupled to the rams 148 for axial reciprocation in opposition to lower section 142. Mold sections 132, 134, 142, and 146 have opposed faces which, in the closed position of the various mold sections illustrated in FIG. 5, form a mold cavity for compression-molding and cure of the mold charge 80. (It will be appreciated, of course, that mold contour and complexity depends primarily on wheel configuration.)

Figure 7:
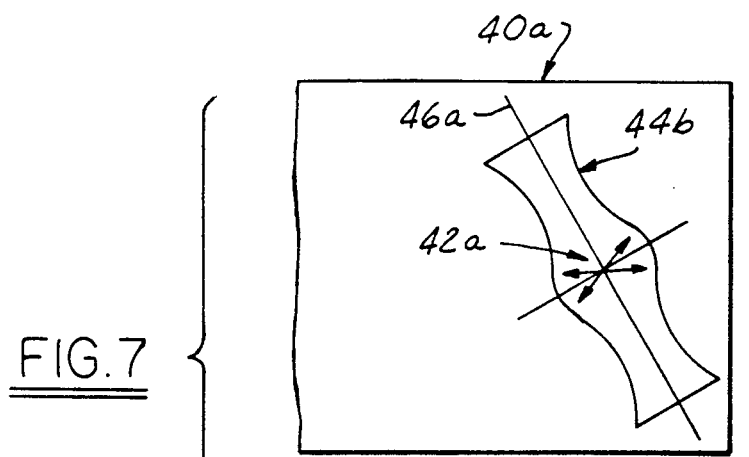

FIG. 6 illustrates a modification wherein sheet 40a has crossed or mesh fibers 42a oriented other than orthogonally to each other, and with the major axis 46a of section 44a bisecting the acute angle between the mesh fibers. When section 44a is stretched in the direction of its axis 46a, the reinforcing fibers again shift toward axis 46 to reduce such acute angle and assume orientations extending almost lengthwise of section 44. FIG. 7 illustrates a further modification in which the section 44b is this time cut from sheet 40a so that the major axis 46b bisects the obtuse angle between the fibers 42a. When section 44b is stretched in the direction of axis 46b, the reinforcing fibers shift to substantially orthogonal orientation at angles of about 45° to axis 46b.

Figure 8:
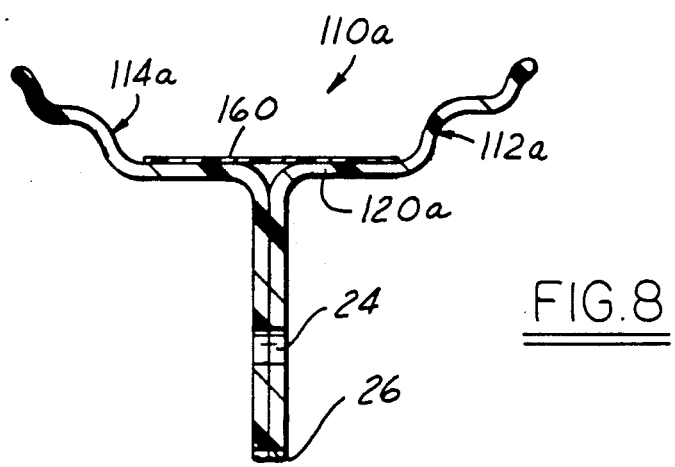
FIG. 8 is a fragmentary sectional view of a third wheel constructed in accordance with the invention.

FIG. 8 illustrates a modification to the wheel of FIG. 4 in which the mold charge half-sections 112a, 114a are placed in a mold and compression molded into a single integral wheel structure 110a. Bolts 118 and nuts 116 in the embodiment of FIG. 4 are thereby eliminated. A reinforcing wrap 160 of molding compound such as resin-impregnated cloth may be added around the outer surface of the rim base 120a to strengthen the joint, either before compression molding such that wrap 160 becomes integral with sections 114a, 116a, or following compression molding of the half-sections. The former is preferred for enhanced reinforcement and sealing.

The invention claimed is:

1. A method of making a cup-shaped member of fiber-reinforced resin construction comprising the steps of:
   (a) providing a mandrel of generally cylindrical external geometry having a generally flat top and essentially a cylindrical external sidewall,
   (b) forming a plurality of at least two sections of fiber-reinforced sheet molding compound, each of said sections having a central portion with opposed convex side edges and a pair of diametrically opposed radially outwardly projecting integral wings having a common central axis and concave side edges coupled to said convex side edges of said central portion,
   (c) placing said sections over said mandrel with said central portions of said sections externally overlying said mandrel top and with said wings externally draping over said mandrel sidewall to form a cup-shaped mold charge in which wings of said plurality of sections are circumferentially staggered around said sidewall, and
   (d) compression molding said mold charge to form an integral cup-shaped member of fiber-reinforced resin construction.

2. The method set forth in claim 1 wherein said sheet molding compound comprises resin-impregnated cloth having crossed reinforcing fibers.

3. The method set forth in claim 2 wherein said wings have straight end edges remote from said central portions and orthogonal to said central axis.

4. The method set forth in claim 2 comprising the additional steps between said steps (b) and (c) of:
   (e) stretching each said section in the direction of said axis so as to reduce angles of said crossed fibers with respect to said axis.

5. The method set forth in claim 3 wherein said central portion of each said section has a dimension between said convex side edges orthogonal to said axis substantially equal to diameter of said generally flat mandrel top.

6. The method set forth in claim 1 comprises the additional step of providing a compression mold having first and second mold sections opposed to each other along a mold axis, at least one of said mold sections being moveable with respect to the other along said axis between open and closed positions, said first and second mold sections respectively possessing convex and concave mold surfaces which cooperate with each other in said closed position to form a generally cup-shaped mold cavity, said steps (a) and (c) being carried out while employing said first mold section having said convex mold face on said mandrel.

7. The method set forth in claim 4 wherein said step (b) comprises the steps of:
(b1) selecting sheet molding compound having orthogonally oriented reinforcing fibers, and
(b2) forming said sections to have said central axis diametrically through said central portion and said wings at an angle of substantially 45° to said orthogonally oriented fibers.

8. The method set forth in claim 4 wherein said step (b) comprises the steps of:
(b1) selecting sheet molding compound having crossed non-orthogonally oriented reinforcing fibers, and
(b2) forming said sections to have said central axis diametrically through said central portion and said wings bisecting the acute angle between said fibers.

9. The method set forth in claim 4 wherein said step (b) comprises the steps of:
(b1) selecting sheet molding compound having crossed non-orthogonally oriented reinforcing fibers, and
(b2) forming said sections to have said central axis diametrically through said central portion and said wings bisecting the obtuse angle between said fibers.

10. The method set forth in claim 9 wherein said step (e) comprises the step of stretching each said section until said fibers are substantially orthogonal.

11. A method of making a vehicle wheel segment which includes a disc portion for mounting of the wheel to a vehicle and an annular rim portion axially projecting from an outer edge of said rim portion for mounting of a vehicle tire, said method comprising the steps of:
(a) forming a plurality of at least two sections of resin-impregnated cloth having crossed reinforcing fibers, each of said sections having a central portion with convex side edges and a pair of diametrically opposed radially outwardly projecting wings integral with said central portion having concave side edges, each said section having a central axis of symmetry bisecting said central portion and said wings and bisecting angles of orientation between said fibers such that said fibers are symmetrically oriented with respect to said axis,
(b) placing said sections over a mandrel to form a first mold charge having a generally flat top and an annular sidewall, with said central portions of said sections externally overlying said mandrel top, said wings externally draping over said mandrel sidewall and said central axes of said sections circumferentially staggered, and
(c) compression molding said mold charge to form an integral wheel segment of fiber-reinforced resin composition.

12. The method set forth in claim 11 wherein said wings have straight end edges remote from said central portions and orthogonal to said central axes.

13. The method set forth in claim 12 comprising the additional step, prior to said step (b), of:
(d) stretching each said section in the direction of said axis so as to reduce angles of said reinforcing fibers with respect to said axis and deform said end edges to a convex configuration.

14. The method set forth in claim 13 wherein said central portion of each said section has a dimension between said convex side edges orthogonal to said axis substantially equal to diameter of said generally flat mandrel top.

15. The method set forth in claim 14 wherein said step (a) comprises the steps of:
(a1) selecting resin-impregnated cloth having orthogonally oriented reinforcing fibers, and
(a2) forming said sections to have said central axis diametrically through said central portion and said wings at an angle of substantially 45° to said orthogonally oriented fibers.

16. The method set forth in claim 15 wherein said step (a) comprises the steps of:
(a1) selecting resin-impregnated cloth having crossed non-orthogonally oriented reinforcing fibers, and
(a2) forming said sections to have said central axis diametrically through said central portion and said wings bisecting the acute angle between said fibers.

17. The method set forth in claim 15 wherein said step (a) comprises the steps of:
(a1) selecting resin-impregnated cloth having crossed non-orthogonally oriented reinforcing fibers, and
(b2) forming said sections to have said central axis diametrically through said central portion and said wings bisecting the obtuse angle between said fibers.

18. The method set forth in claim 17 wherein said step (d) comprises the step of stretching each said section until said fibers are substantially orthogonal.

19. The method set forth in claim 14 comprising the additional steps of:
(e) prior to said step (c), preparing a second mold charge as recited in said steps (a)–(b) and (d),
(f) placing said first and second mold charges in a mold with the said wings of said mold charges axially oppositely oriented, and then
(g) compression molding said charges as set forth in step (c) to form an integral two-segment wheel structure.

20. The method set forth in claim 19 comprising the additional step prior to said step (g) of:
(h) wrapping resin-impregnated cloth around said first and second mold charges where said central portions abut, and then
(i) molding said wrapped cloth integrally with said mold charges in said step (g).

* * * * *